United States Patent [19]

O'Rourke et al.

[11] 4,070,961

[45] Jan. 31, 1978

[54] WASTE DIVERTER APPARATUS FOR A WASTE DISPOSAL SYSTEM

[75] Inventors: James O'Rourke, Waldwick, N.J.; Murray Feldberg, Brooklyn, N.Y.

[73] Assignee: Multi-Pak Corporation, Hackensack, N.J.

[21] Appl. No.: 637,532

[22] Filed: Dec. 4, 1975

[51] Int. Cl.[2] .......................... B30B 15/30; B65G 11/20

[52] U.S. Cl. .......................... 100/185; 137/872; 137/883; 193/31 R

[58] Field of Search .......................... 193/31 R, 31 A, 20, 193/21; 243/29, 30; 141/248; 222/482, 559, 561; 137/610; 302/27, 28; 100/45, 186, 185; 105/254, 282 R

[56] References Cited

U.S. PATENT DOCUMENTS

| | | | |
|---|---|---|---|
| 498,558 | 5/1893 | Lee | 193/31 R |
| 782,485 | 2/1905 | Campbell | 193/16 |
| 3,872,784 | 3/1975 | Kaszuba et al. | 193/31 A |
| 3,933,393 | 1/1976 | De Feudis | 302/27 |

FOREIGN PATENT DOCUMENTS

| | | | |
|---|---|---|---|
| 1,217,865 | 5/1966 | Germany | 193/31 R |
| 924,328 | 4/1963 | United Kingdom | 302/59 |

*Primary Examiner*—Evon C. Blunk

*Assistant Examiner*—James L. Rowland

*Attorney, Agent, or Firm*—Cooper, Dunham, Clark, Griffin & Moran

[57] ABSTRACT

A waste disposal system embodies a waste diverter apparatus for receiving waste from a single waste supplying chute and selectably controlling distribution of the waste to a pair of waste outlet chutes. Each of the waste outlet chutes is connected to a waste compactor or other suitable means for waste disposal. The waste diverter apparatus includes a waste diverter housing which has a single waste inlet opening, and a pair of waste outlet openings which connect to the pair of waste outlet chutes. A waste outlet gate is provided for each waste outlet opening, and each gate slides horizontally to open and close its corresponding waste outlet opening. The waste outlet gates are supported in a vee configuration by three parallel horizontal bars; a single lower bar having two slotted tracks to receive the lower edges of both waste outlet gates, and a pair of spaced, horizontal upper support bars, each parallel to the lower bar and each having a single slotted track to receive the upper portion of one waste outlet gate. Each of the waste outlet gates is independently activated by an associated hydraulic driving ram, which is connected to its associated gate by a suitable driving shaft.

4 Claims, 3 Drawing Figures

WASTE DIVERTER APPARATUS FOR A WASTE DISPOSAL SYSTEM

BACKGROUND OF THE INVENTION

This invention relates to waste disposal systems, and more particularly relates to waste disposal systems of the type having a waste diverter apparatus for selectably feeding a pair of waste compactors or the like from a single waste supplying chute.

A refuse disposal system having a pair of trash compactors and a trash diverter for selectively directing waste material to either one or the other comparator by means of a single swinging or pivoting diverter gate is shown in U.S. Pat. No. 3,872,784. However, a number of serious drawbacks are inherent in the single pivoting gate construction disclosed therein. Should waste material become backed up over the gate, the gate may become jammed, thus blocking access to the second compactor just when such access is needed. Furthermore, the use of a single pivoting gate permits only an either-or selection, without the capability of blocking access to both compactors or permitting waste to be fed to both compactors simultaneously.

The concept of a switch or valve employing a pair of gates is shown in U.S. Pat. Nos. 389,589, 498,558, and 782,485 as well as in German Pat. No. 1,217,865. These various gating mechanisms, typically for use in coal chutes or grain elevators, all use vertically movable gates driven by gears, ropes, levers and the like, and are generally unsuitable for use in waste disposal systems.

SUMMARY OF THE INVENTION

An object of the present invention is to provide a waste disposal system having a waste diverter apparatus which is strong, simple, relatively, jam-free and easily adaptable to present waste disposal systems.

It is a further object of the invention to provide a waste diverter apparatus in which waste may be directed to one or both of a pair of waste compactors, or may be prevented from reaching either compactor.

To these and other ends the present invention contemplates a waste diverter housing in which waste distribution through a pair of waste outlet openings is controlled by a pair of horizontally slidable waste outlet gates. A pair of slots is provided in the waste diverter housing, and each gate is slidable through its associated slot from a first position outside the diverter housing to a second position within the housing. When a gate is in the first, or external position, waste may flow through the exposed waste outlet opening in the diverter housing, through the waste outlet chute connected thereto, and into the waste compactor. In the second, or internal position, the gate covers its associated waste outlet opening and thereby prevents the flow of waste through the outlet chute to the compactor. The two horizontally slidable gates may advantageously be mounted in a vee configuration, with the lower horizontal edges of both gates being slidably mounted in a pair of slotted tracks in a lower horizontal breaker bar, while the spaced upper horizontal edges of the gates are slidably mounted in a pair of spaced horizontal upper support bars.

Each waste outlet gate may be driven by an independently activated hydraulic driving ram, so that a wide range of control is achieved. By employing a pair of independently driven gates, it is possible to completely shut off the system at the diverter housing; to open just one or the other of the waste outlet openings; or to open both waste outlet openings so that both compactors are simultaneously fed for maximum capacity. With prior art diverters employing a single pivoted gate, this range of control is not obtainable.

The use of waste outlet gates which are horizontally, rather than vertically, slidable yields a number of important advantages. In waste processing systems, horizontally slidable gates are less prone to jamming than the conventional vertically slidable gates typically used for other applications, such as grain and coal distribution. Furthermore, should a gate be blocked or otherwise prevented from closing fully, there will be less possibility of interference and waste build-up with a horizontally slidable gate system. This is because the blockage, and the resulting partial opening of the gate will inherently be limited to one end of the waste outlet opening. If a vertically slidable gate is prevented from closing fully, on the other hand, a partial opening will be presented to the waste flow along the full width of the diverter housing adjacent to the lower portion of the outlet gate. If a vertical-gate unit were to continue in operation after this type of blockage, waste build-up and interference along the full horizontal width of the diverter housing would be likely as pieces of waste would tend to become entrapped in the partially exposed waste outlet opening. Furthermore, installation of a horizontal-gate unit is substantially easier and less expensive than a comparable vertcal-gate unit, since the problems associated with obtaining the additional vertical clearance required for vertically slidable gates are eliminated.

DETAILED DESCRIPTION

Figure 1:
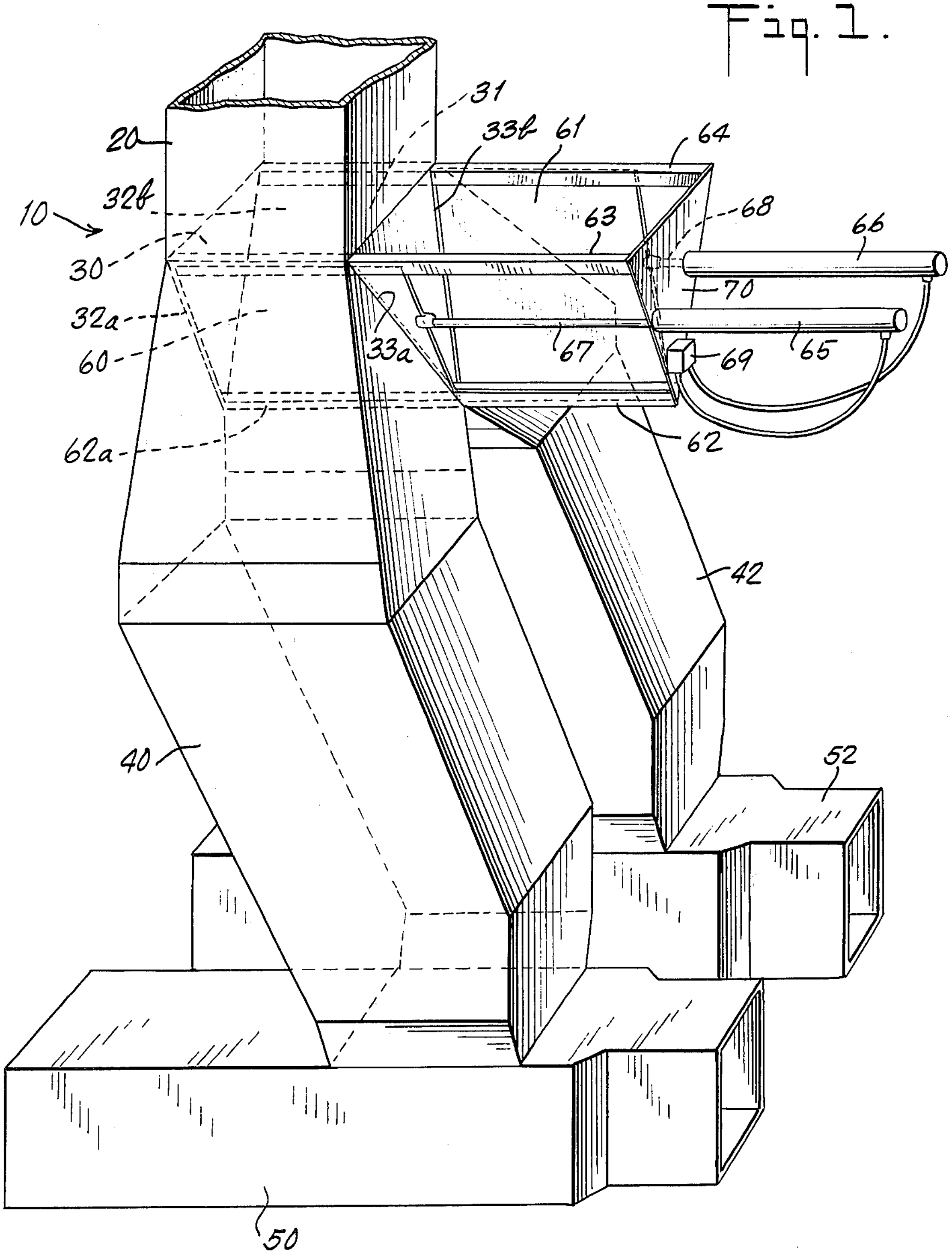
FIG. 1 is a perspective view of a waste disposal system having a waste diverter apparatus in accordance with the invention.

Referring to FIG. 1 of the drawings there is shown a waste disposal system generally identified by the reference numeral 10, in which a waste diverter housing 30 is adapted to receive waste from a single waste supplying chute 20 through a waste inlet opening 31. Waste diverter housing 30 is provided with two waste outlet openings 32a and 32b which respectively connect the waste diverter housing 30 with waste outlet chutes 40 and 42. The waste outlet chutes 40 and 42 in turn lead, respectively, to a pair of waste compactors 50 and 52.

Waste diverter housing 30 is provided with a single horizontal lower support or breaker bar 62 and a pair of spaced horizontal upper support bars 63 and 64, each parallel to the breaker bar. These three bars extend across the full width of the waste diverter housing 30 and protrude beyond the diverter housing at its forward side, as shown in FIG. 1. Bars 62, 63 and 64 are supported and maintained in alignment at their extended or protruding ends by a triangular support plate 70.

Figure 3:
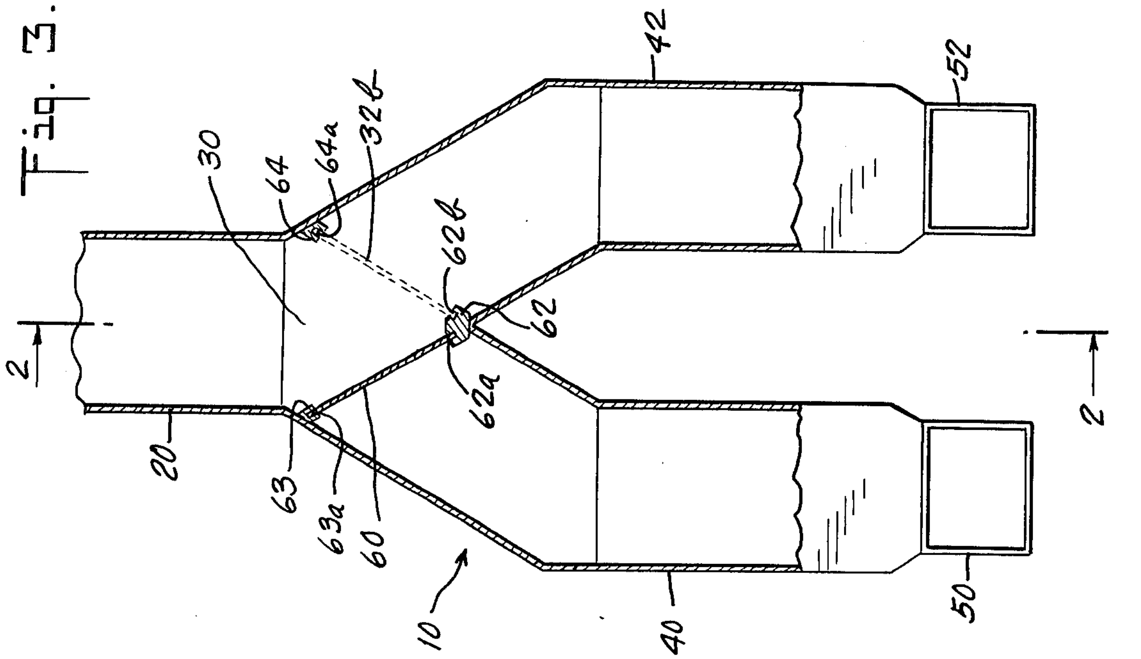
FIG. 3 is a cross-sectional view of the waste disposal system taken along the lines 3—3 of FIG. 2.

A pair of flat, rectangular metallic waste outlet gates 60 and 61 are slidably supported for horizontal motion by the three support bars. With reference to FIG. 3, upper support bars 63 and 64 are each provided with a single slotted track, shown at 63*a* for bar 63 and at 64*a* for bar 64. Slotted track 63*a* receives the upper horizontal edge of gate 60 and slotted track 64a receives the upper horizontal edge of gate 61. Again referring to FIG. 3, lower breaker bar 62 is provided with a pair of slotted tracks 62a and 62b for slidably supporting the lower edges of both waste outlet gates. Thus, as seen in FIGS. 1 and 3, the gates are slidably supported in a vee configuration.

Lower horizontal support bar 62 serves a dual function in the disclosed system. In addition to serving as the lower supporting member for each of the slidably mounted waste outlet gates, the portion of the bar 62a mounted within the waste diverter housing serves as a breaker bar to slow down and divert heavy, rapidly falling waste material received from waste supplying chute 20 toward the waste outlet openings, to thereby prevent damage to other portions of the system. Breaker bar 62 is accordingly of larger cross section than the upper support bars 63 and 64, as shown in FIG. 3, and may be made of a suitably strong material, such as high strength steel. Note that the horizontal supporting bars protrude outwardly from the waste diverter housing for a distance greater that that of the width of the waste outlet gates. The purpose of this extension is to permit the support bars to receive the waste outlet gates when these gates are outside the waste diverter housing.

Referring again to FIG. 1, gates 60 and 61 are provided with driving shaft 67 and 68, respectively, which are in turn connected to driving means 65 and 66. These driving means are typically hydraulic driving rams of conventional design, and are accordingly not described in detail. The driving rams are independently activated to drive the gates in and out of the waste diverter housing by a conventional control mechanism 69.

Figure 2:
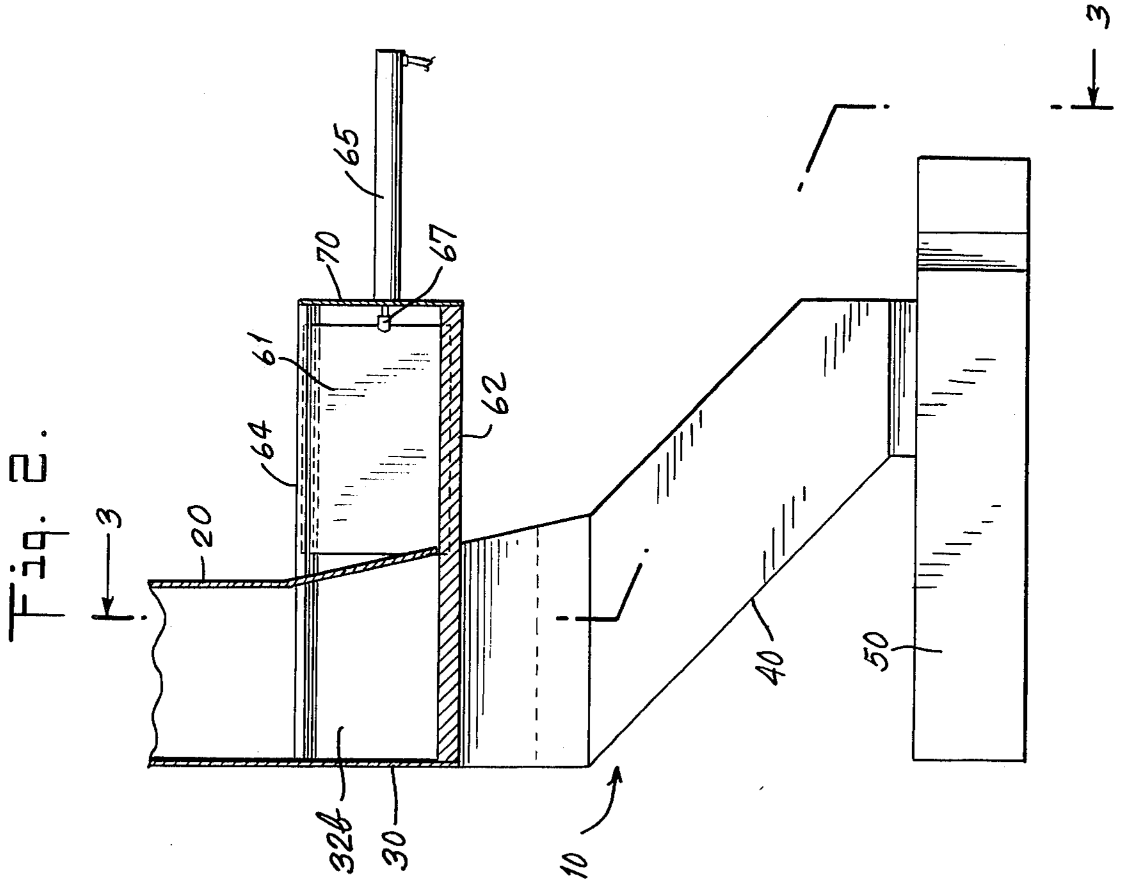
FIG. 2 is a cross-sectional view of the waste disposal system taken along the lines 2—2 in FIG. 3.

Waste diverter housing 30 is provided with a pair of slots 33a and 33b, which extend in a vee configuration from the upper support bars 63 and 64 to the lower support or breaker bar 62. Slots 33a and 33b permit waste outlet gates 60 and 61 to slide from a first position substantially outside the waste diverter housing to a second position substantially within the housing by suitable activation of their associated driving rams. In FIG. 1, gate 60 is shown substantially within the waste diverter housing, while in FIGS. 1 and 2, gate 61 is shown substantially outside the housing.

Waste outlet gate 61 is shown positioned outside the housing to permit waste from waste supplying chute 20 to be supplied to compactor 52 through uncovered waste outlet opening 32b of waste diverter housing 30 and waste outlet chute 42. Waste outlet opening 32a of the waste diverter housing is shown substantially closed off by gate 60, thus preventing the flow of waste from the waste supplying chute 20 to compactor 50 through waste outlet chute 40. Alternatively, waste outlet opening 32b may be closed off by gate 61 while waste outlet 32a may be opened by gate 60 to permit the system to feed only compactor 50. Should it be desired to completely shut off the flow of waste to both compactors, this may easily be accomplished by activating both hydraulic driving rams to drive both gates into the diverter housing and thereby close off both waste outlet openings. Both compactors can also be fed simultaneously by activating the driving rams to slide both gates outside the diverter housing, thus opening both waste outlet openings. It is also possible to drive one or both gates to an intermediate position, thus partially closing off one or both waste outlet openings, should this be desired. Thus, the disclosed waste diverter apparatus provides a highly flexible, yet highly reliable means for controlling waste distribution in a waste disposal system.

While the invention has been particularly shown and described with reference to a preferred embodiment thereof, it will be understood by those skilled in the art that various changes in the form and details of the invention may be made without departing from the spirit and scope of the invention.

What is claimed is:

1. An improved waste disposal system of the type having a single waste supplying chute, a waste diverter housing having a waste inlet opening for receiving waste from said waste supplying chute and means for selectably directing said waste to a pair of waste outlet openings in said diverter housing, a pair of waste compactors, and a pair of waste outlet chutes for connecting each said waste compactor to a waste outlet opening of said waste diverter, wherein the improvement comprises:

separate waste outlet gates for each of said waste outlet openings, said gates being horizontally slidable between a first position substantially outside said diverter housing which opens their corresponding waste outlet openings and a second position substantially within said housing which closes said corresponding waste outlet openings and being substantially equal in size to said waste outlet openings; means for slidably supporting said horizontally slidable gates ... consisting of a single horizontal lower support element having two slotted tracks to receive the lower portions of said gates, and a pair of spaced horizontal upper support elements, each parallel to said lower support element and having a single slotted track to receive the upper portion of one of said gates, said upper and lower horizontal support elements slidably supporting said gates in a vee configuration; and control means for independently driving each of said gates between said first position and said second position.

2. An improved waste disposal system as in claim 1, wherein said horizontal lower support element is a metal breaker bar for diverting vertically falling waste within said waste diverter housing toward said waste outlet openings.

3. An improved waste disposal system as in claim 2, wherein said waste outlet gates comprise flat metal plates and said control means for independently driving each of said gates comprises an independently activated hydraulic driving ram for each gate connected to each said gate by a driving shaft.

4. A waste diverter apparatus for receiving waste from a single waste supplying chute and selectably controlling the distribution of said waste to a pair of waste outlet chutes, which comprises:

a waste diverter housing having a single waste inlet opening connected to said waste supplying chute and a pair of waste outlet openings, each said outlet opening connected to one of said waste outlet chutes;

a flat rectangular metallic waste outlet gate for each of said waste outlet openings;

a single horizontal metallic lower breaker bar in said diverter housing having two horizontal slotted tracks for slidably supporting the lower portions of said waste outlet gates for horizontal movement, said bar extending beyond said diverter housing at a first side thereof for a distance sufficient to support said gates outside said diverter housing;

a pair of spaced horizontal upper support bars in said diverter housing, each parallel to said breaker bar and having a single slotted track to receive the upper portion of one of said gates, said upper support bars extending beyond said diverter housing at said first side for a distance sufficient to support said gates outside said diverter housing, and said upper and lower horizontal bars slidably supporting said gates in a vee configuration;

support means remote from said waste diverter housing for holding the extended portions of said lower breaker bar and said upper support bars in fixed parallel relationship; and an independently activated hydraulic driving ram for each waste outlet gate, each said driving ram being mounted on said support means and connected to its associated gate by a driving shaft, for driving each said gate between a first position substantially outside said diverter housing and a second position substantially within said housing.

* * * * *

UNITED STATES PATENT AND TRADEMARK OFFICE
CERTIFICATE OF CORRECTION

PATENT NO. : 4,070,961

DATED : January 31, 1978

INVENTOR(S) : JAMES O'ROURKE and MURRAY FELDBERG

It is certified that error appears in the above-identified patent and that said Letters Patent are hereby corrected as shown below:

Col. 1, line 13, "comparator" should read -- compactor --

Col. 1, line 36, delete the comma (,) after "relatively"

Col. 4, line 47 (Claim 3), "claim 2" should read -- claim 1 --

Signed and Sealed this

*Twenty-ninth* Day of *August 1978*

[SEAL]

*Attest:*

RUTH C. MASON
*Attesting Officer*

DONALD W. BANNER
*Commissioner of Patents and Trademarks*